(12) United States Patent
Gutin (10) Patent No.: US 7,545,511 B1
(45) Date of Patent: Jun. 9, 2009

(54) TRANSMITTED WAVEFRONT METROLOGY OF OPTICS WITH HIGH ABERRATIONS

(75) Inventor: Mikhail Gutin, Albany, NY (US)

(73) Assignee: Applied Science Innovations, Inc., Troy, NY (US)

( * ) Notice: Subject to any disclaimer, the term of this patent is extended or adjusted under 35 U.S.C. 154(b) by 327 days.

(21) Appl. No.: 11/622,152

(22) Filed: Jan. 11, 2007

Related U.S. Application Data (60) Provisional application No. 60/758,649, filed on Jan. 13, 2006.

(51) Int. Cl.
G01B 11/02 (2006.01)
(52) U.S. Cl. .................................................. 356/512
(58) Field of Classification Search ................. 356/508, 356/510–513, 515
See application file for complete search history.

(56) References Cited

U.S. PATENT DOCUMENTS

| | | | |
|---|---|---|---|
| 5,625,454 | A | 4/1997 | Huang et al. |
| 5,768,150 | A | 6/1998 | Sonoda et al. |
| 5,815,268 | A | 9/1998 | LaFleur |
| 6,008,904 | A | 12/1999 | Ishii et al. |
| 6,195,168 | B1 | 2/2001 | De Lega et al. |
| 6,456,382 | B2 | 9/2002 | Ichihara et al. |
| 6,480,284 | B1 | 11/2002 | Stenton |
| 6,624,895 | B1 | 9/2003 | Moriyasu et al. |
| 6,714,307 | B2 | 3/2004 | DeGroot et al. |
| 6,714,308 | B2 | 3/2004 | Evans et al. |
| 6,717,679 | B2 | 4/2004 | Kuchel |
| 6,771,375 | B2 | 8/2004 | Zanoni |
| 6,781,700 | B2 | 8/2004 | Kuchel |
| 6,785,006 | B2 | 8/2004 | Nishida |
| 6,801,323 | B2 | 10/2004 | Evans |
| 6,842,255 | B2 | 1/2005 | Ohsaki et al. |
| 6,879,402 | B2 | 4/2005 | Kuchel |

(Continued)

FOREIGN PATENT DOCUMENTS

WO   WO 2006/091415 A2   8/2006

OTHER PUBLICATIONS

Scott A. Lerner. Jose M. Sasian, John E. Greivenkamp Robert 0. Gappinger, Steve R. Clark. Interferometric Metrology of Conformal Domes. Apr. 1999 SPIE vol. 3705, pp. 221-226, 1999.

(Continued)

*Primary Examiner*—Michael A Lyons
(74) *Attorney, Agent, or Firm*—Jay R. Yablon (57) ABSTRACT

Disclosed herein is an interferometry device and associated method and computerized media for testing optical components including those with high aberrations, comprising: situating an optical component under test between a source of a spherical test wavefront and a spherical reference mirror; propagating a spherical test wavefront, whereby an axial line is defined by a direction of propagation of said wavefront; deriving a substantially complete first-tilt-alignment wavefront metrology of the optical component under test from a plurality of first-tilt-alignment interferograms obtained with the optical component under test held fixed at a first predetermined tilt angle relative to a direction of propagation of said wavefront; and varying an axial displacement between the optical component under test and the spherical reference mirror to obtain each first-tilt-alignment interferogram. By varying the tilt angle, one can also derive a substantially complete surface metrology of the optical component under test.

27 Claims, 4 Drawing Sheets

U.S. PATENT DOCUMENTS

| | | |
|---|---|---|
| 6,894,788 B2 | 5/2005 | Deck |
| 6,912,055 B2 | 6/2005 | Ueki et al. |
| 6,956,657 B2 | 10/2005 | Golini et al. |
| 6,963,408 B2 * | 11/2005 | Ishii et al. ............ 356/521 |
| 6,965,435 B2 | 11/2005 | Ina |
| 6,967,724 B2 | 11/2005 | Nishida |
| 6,972,849 B2 | 12/2005 | Kuchel |
| 6,972,850 B2 | 12/2005 | Ohtsuka et al. |
| 6,987,570 B1 | 1/2006 | Schmit et al. |
| 6,999,182 B2 | 2/2006 | Thibault |
| 7,012,700 B2 | 3/2006 | DeGroot et al. |
| 7,030,996 B2 | 4/2006 | DeGroot et al. |
| 7,072,042 B2 | 7/2006 | Kim et al. |
| 7,106,454 B2 | 9/2006 | De Groot et al. |
| 7,123,365 B1 | 10/2006 | Schulte |
| 7,126,698 B2 | 10/2006 | DeGroot et al. |
| 7,375,824 B2 * | 5/2008 | Kuhn et al. ............ 356/513 |
| 2002/0012124 A1 | 1/2002 | Nakayama |
| 2002/0118370 A1 | 8/2002 | Nishida |
| 2003/0002048 A1 | 1/2003 | Zanoni |
| 2003/0002049 A1 | 1/2003 | Kuchel |
| 2003/0011784 A1 | 1/2003 | De Groot et al. |
| 2003/0043385 A1 | 3/2003 | Kuchel |
| 2003/0048457 A1 | 3/2003 | Evans et al. |
| 2003/0103215 A1 | 6/2003 | Kuchel |
| 2003/0169430 A1 | 9/2003 | Ohtsuka et al. |
| 2003/0184762 A1 | 10/2003 | Kim et al. |
| 2003/0184763 A1 | 10/2003 | Ueki et al. |
| 2004/0239947 A1 | 12/2004 | De Groot et al. |
| 2004/0257584 A1 | 12/2004 | Nishida |
| 2005/0134863 A1 | 6/2005 | De Lega et al. |
| 2005/0157311 A1 | 7/2005 | Kuchel |
| 2006/0256347 A1 | 11/2006 | Lindner |
| 2006/0268282 A1 | 11/2006 | Evans et al. |

OTHER PUBLICATIONS

J. Fleig, P. Dumas, P. E. Murphy, G. W. Forbes. An automated subaperture stitching interferometer workstation for spherical and aspherical surfaces. Proc. SPIE vol. 5188, 2003.

P. E. Murphy, J. Fleig, G. Forbes, M. Tricard. High precision metrology of domes and aspheric optics. Proc. SPIE vol. 5786, 2005.

* cited by examiner

TRANSMITTED WAVEFRONT METROLOGY OF OPTICS WITH HIGH ABERRATIONS

CROSS-REFERENCE TO RELATED APPLICATIONS

This application claims benefit of provisional application U.S. 60/758,649 filed Jan. 13, 2006.

BACKGROUND OF THE INVENTION

Traditional optical metrology is intended for measurement of optics with low aberrations. Attempts to adapt traditional metrology to measurement of highly aberrated wavefronts and surfaces meet several limitations. Conventional metrology with plane or spherical reference produces fringe patterns with high spatial frequencies, which cannot be resolved by the interferometer imaging sensor. Aspheric null mirrors pose the problem of fabrication, testing the null itself, and alignment.

It would instead be desirable to use one simple shape of the reference optics for all shapes of highly aberrated optics to be tested, allow for relaxed tolerances on the reference, have low requirements to the resolution of the imaging sensor, and feature easy fabrication, testing, and alignment of all components of the metrology system and method.

The invention disclosed herein will serve as an attachment to a standard interferometer. It is planned for use by optical fabrication facilities in production of optics, both aspheric and spherical, and highly aberrated optics in general. The hardware of this invention will be compatible with standard commercial interferometers already in use by fabrication facilities. The metrology according to this invention will further use standard procedures from the operator standpoint, to reduce "psychological threshold" for its application in existing manufacturing processes. One of the distinctive features of the invention is the low cost.

The system and method according to this invention are uniquely beneficial for testing existing and emerging optics designed with high aberrations. It will find applications to new types of highly aberrated, aspheric optics. For example, as precision single-point diamond turning continues to grow popular and moldable infrared glasses enable new types of optical systems, surface shapes previously considered exotic are becoming mainstream. Compound lenses will continue to emerge with aspheric components that have intentionally high aberrations prior to assembly. While testing the assembled lens is possible with traditional interferometers, the metrology according to this invention, performed on individual components, may enable otherwise impossible tests at earlier fabrication stages, to improve quality, increase productivity, and reduce cost. The ability of this invention to measure highly aberrated optics will enable new optical designs which are presently difficult to implement and impossible to test.

Many interferometers are commercially available, applicable to measurement of wavefronts optical figures of optical components. Common to all methods of interferometry are the following requirements: 1) the setup must get light back into the interferometer; 2) the sensor must be able to resolve the fringes; and 3) the optical test setup must be precisely defined for calculation of the wavefront.

Transparent domes introduce significant aberrations into transmitted wavefronts. With the exception of a spherical dome illuminated by a spherical wavefront concentric with the dome, wavefront aberrations are always present and significant, especially in deep concave shapes typical of aerodynamically conformal domes. For example, the corrector optics inside a missile dome is designed to compensate these aberrations. The compensation typically varies with the look angle of the gimbaled corrector optics inside the dome. Therefore, unlike production and testing of low-aberration optics, the task of fabricating and testing aspheric domes and associated corrector optics is to make and test optics "highly aberrated by design." Traditional interferometry is not directly applicable to this task; it serves to measure small amounts of aberrations. At large aberrations, the spatial frequency of the fringe pattern exceeds the Nyquist limit, so that the pattern is undersampled by the imaging sensor. This causes either complete failure of the measurement or loss of confidence in the result, e.g., due to assumptions about the wavefront shape made in sub-Nyquist sampling, such as described by Lerner et al (Scott A. Lerner. Jose M. Sasian. John E. Greivenkamp Robert O. Gappinger. Steve R. Clark. Interferometric Metrology of Conformal Domes. April 1999 SPIE Vol. 3705, pp. 221-226, 1999.). The same paper analyzed several layouts of interferometric transmitted wavefront testing, as summarized in FIG. 1, a). Of the multiple options considered, identified as promising were the sub-aperture stitching and aspheric null for full-aperture testing. Testing with full-frame registration and spherical reference was rejected due to unresolved fringes.

Null mirrors may be used to back-reflect the aberrated wavefront, so that for the "proper" aberrations, the surface of the null reflector is coincident with the aberrated wavefront. The three major difficulties of this approach are fabrication, testing, and alignment. While fabrication of aspheric rotationally-symmetric nulls is possible with modern single-point diamond turning, their testing is a difficult task. The optical figure of the null reference needs to be guaranteed with accuracy higher than that of the conformal dome. Therefore, the task of testing the null is even more challenging than that of testing the dome itself. Finally, aspheric optics tends to be more sensitive to all types of misalignment, compared to conventional spherical optics, posing the alignment and stability problems in testing deep concave domes.

Holographic and digital holographic nulls pose significant application problems as well. Traditional film holograms may work in reflection or in transmission. Reflective holograms have to be thick for the mid-IR working wavelength, which makes fabrication difficult. In transmission (combined with a mirror), efficiency of a film hologram would be low, with two passes required. Both types are likely to suffer from stability issues. Digital holograms with dynamic control require liquid crystal (LC) spatial light modulators (SLM). The pixel pitch of such modulators is presently not sufficiently-fine for the large diffraction angles required in dome inspection. The feasible size of the LC SLM is typically smaller than required. Static computer generated holograms (CGH) have the same issues as aspheric null mirrors: difficulty of testing and high sensitivity to misalignment.

Figure 1:
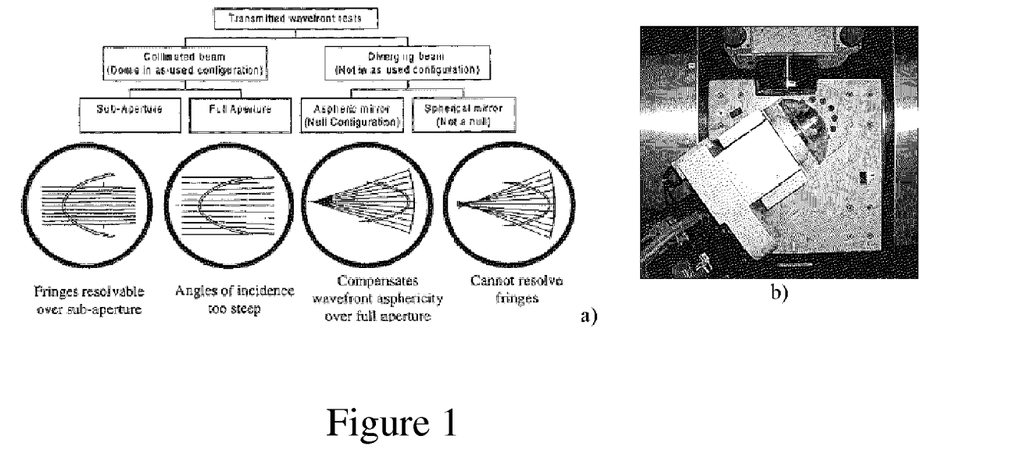
FIG. 1 summarizes a) methods for transmitted wavefront metrology by Lerner et al; b) Subaperture Stitching Interferometry on a spherical dome, which is not applicable to aspheric domes (J. Fleig, P. Dumas, P. E. Murphy, G. W. Forbes. An automated subaperture stitching interferometer workstation for spherical and aspherical surfaces. Proc. SPIE Vol. 5188, 2003 [Fleig et al.]; and P. E. Murphy, J. Fleig, G. Forbes, M. Tricard. High precision metrology of domes and aspheric optics. Proc. SPIE Vol. 5786, 2005 [Murphy et al.]).

Subaperture Stitching Interferometry (SSI) is a popular technique applicable to flat and spherical surfaces. With spherical surfaces, rotation of the optics under test around the center of the sphere provides for capturing multiple interferograms of the subapertures that are later stitched together to provide full aperture wavefront map (FIG. 1, b). A perfect sphere would produce identical wavefront maps from each subaperture, which allows the stitching. Aspheric domes, however, would produce substantially different wavefront maps at different dome orientations. Moreover, the same portion of the dome at a different orientation would produce a different wavefront. For this reason, SSI is not readily applicable to metrology of aspheric domes.

Shack-Hartmann wavefront sensors have inherent limitations in the spatial resolution and the resolution of wavefront measurement. They usually fall short of the resolution provided by interferometers.

In summary, no tools presently exist for optical metrology on deep concave domes. This invention presents a novel system and process for metrology on aspheric, conformal domes, associated corrector optics, and other highly aberrated optics. The invention is compatible with existing metrology tools and manufacturing processes already used in production of large spherical windows and domes.

SUMMARY OF THE INVENTION

Disclosed herein is an interferometry device and associated method and computerized media for testing optical components including those with high aberrations, comprising: situating an optical component under test between a source of a spherical test wavefront and a spherical reference mirror; propagating a spherical test wavefront, whereby an axial line is defined by a direction of propagation of said wavefront; deriving a substantially complete first-tilt-alignment wavefront metrology of the optical component under test from a plurality of first-tilt-alignment interferograms obtained with the optical component under test held fixed at a first predetermined tilt angle relative to a direction of propagation of said wavefront; and varying an axial displacement between the optical component under test and the spherical reference mirror to obtain each first-tilt-alignment interferogram. By varying the tilt angle, one can also derive a substantially complete surface metrology of the optical component under test.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

This invention is a metrology tool for inspection of the optical figure on highly aberrated optics. The invention is an attachment to a standard commercial interferometer of a conventional aperture, with no beam expander required. The design of the preferred embodiment of the attachment ensures effective operation with a standard commercial interferometer, equally applicable to metrology of different types of optics with high aberrations. The same spherical reference mirror is used for testing all optics, irrespective of aberrational properties.

Figure 2:
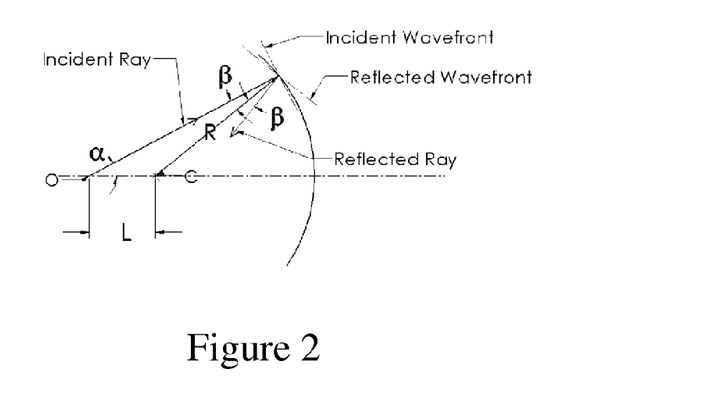
FIG. 2 is a plan view illustrating reflection by a spherical mirror.

Consider reflection of an incident wavefront by a spherical mirror (FIG. 2). A small area of the wavefront may be represented by a ray normal to the wavefront and intersecting the optical axis at point O at an angle $\alpha$. Center C of the spherical mirror, located on the optical axis, is displaced from point O by a distance L.

From the law of sines, $\sin(\beta)=(L/R)\cdot\sin(\alpha)$. This means that the angle between the incident and reflected rays is $2\beta=2\arcsin[\sin(L/R\cdot\sin(\alpha))]$. For small angles, $2\beta\approx2\cdot L/R\cdot\sin(\alpha)$. In an interferometric setup, rays reflected back nearly along the direction of incidence ($2\beta\approx0$) produce large, low-frequency fringes. The spatial frequency of the fringes increases linearly with $2\beta$. This allows controlling the spatial frequency of the fringes by moving the spherical mirror along the optical axis: increasing the distance L results in higher frequency fringes and vise versa. The immediate value of this observation is the possibility to displace the reference spherical mirror by a predetermined amount to make fringe pattern well-resolved in any area of interest on the interferogram. More importantly, wavefront restoration becomes possible from two or more undersampled (sub-Nyquist) interferograms produced at different, known mirror displacements.

For any shape of the wavefront, a small portion of the wavefront can be associated with a ray, similar to the above discussion. Bringing the center C of the reference sphere close to the point O where the ray intersects with the optical axis will result in low-frequency, well-resolved fringes in the corresponding part of the interferogram. By moving the reference spherical reflector along the axis, the complete wavefront can be registered on a set of interferograms, with different portions of the wavefront captured at high resolution on different interferograms—no matter how high the level of aberration. The higher the aberration of the wavefront, the more interferograms will be needed, and vise versa: if the wavefront is close to spherical, one or two interferograms with L≈0 will be sufficient. For highly-aberrated wavefronts, a dozen or more interferograms may be needed. Numerical experimental studies by applicant, described below, include Zemax modeling of aspheric domes. They show that for some relevant dome designs with aspect ratios 1 and larger, as few as three interferograms may be sufficient for measurement with resolutions in the tens of nanometers range, even at the 3.39 µm infrared wavelength.

Figure 3:
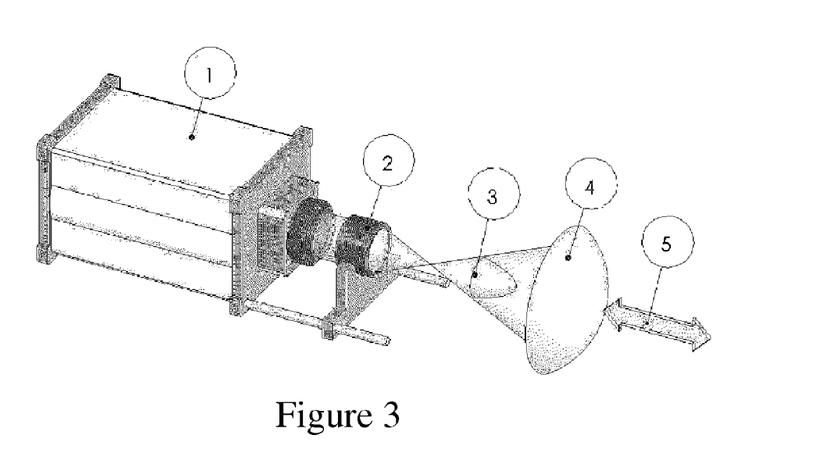
FIG. 3 illustrates a preferred embodiment of the invention including: standard interferometer 1; standard transmission sphere 2; aspheric dome under test 3; spherical reference mirror 4; arrow 5 indicating axial displacement of spherical mirror.

A preferred embodiment of this invention is illustrated by FIG. 3. A spherical wavefront produced by a standard interferometer (1) with a standard spherical attachment (2) illuminates the dome (optical component under test) (3) from the inside, fully covering its optical surface for full aperture coverage. The wavefront transmitted by the dome is reflected by a conventional spherical reference mirror (4), sending it back thought the dome and into the interferometer. Even though the angular coverage of a standard spherical attachment is limited and falls short of hemispherical, the data resulting from measurement measuring the reflected wavefront will represent an exact 3D profile of each individual surface of the dome. These data, produced by a processing algorithm, allow one to further characterize the wavefront aberration for any wavefront shapes if transmitted by the optics under test, including semispherical and those exceeding the $2\pi$ solid angle.

The reference mirror in the preferred embodiment is axially displaced in discrete steps along the optical axis, with interferograms captured at each step. The wavefront incident on the mirror is not spherical due to dome aberrations, and the back-reflected wavefront after the second pass through the dome and the transmission sphere is not plane. Rather, it carries information about the dome aberrations. The fringe pattern registered on the sensor of the interferometer thus characterizes the transmitted wavefront aberrations of the dome. The density, or spatial frequency, of the fringes varies over the frame. A ring-shaped portion of the fringe pattern will contains large, well-resolved fringes. For this portion of the fringe pattern, the transmitted wavefront incident on the reference mirror will closely match the surface of the mirror ($2\beta \approx 0$). The radius of the ring-shaped area of low frequency, well-resolved fringes depends on the axial displacement (displacement along the center line of propagation of the wavefront) of the reference mirror (L). At different locations of the mirror, different parts of the mirror will serve as a best-fit sphere for corresponding portions of the wavefront, and the corresponding portions of the frame will show "well behaved" fringes of low spatial frequency. Jointly, the multiple interferograms obtained by discretely varying the axial displacement yields the overall wavefront measurement with high accuracy and resolution.

Figure 4:
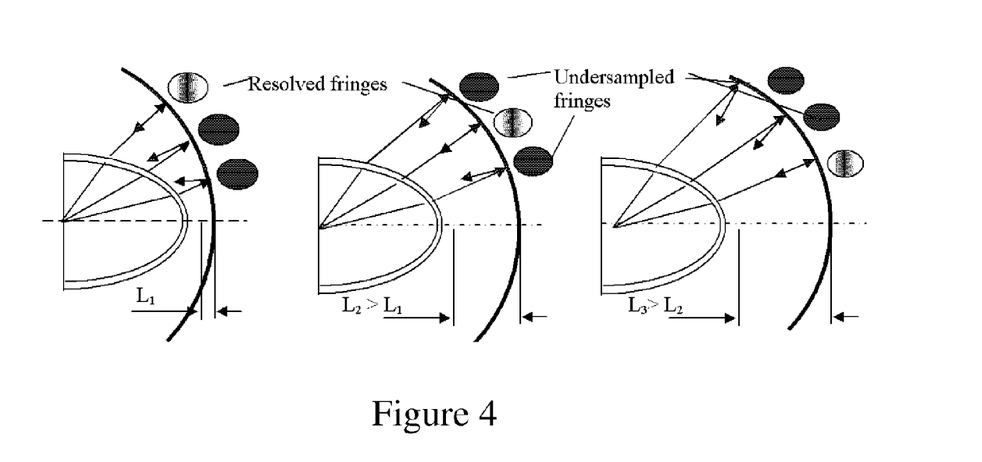
FIG. 4 is a conceptual illustration of the metrology according to the preferred embodiment.

FIG. 4 further illustrates how different portions of the fringe pattern become well resolved at different axial displacements of the spherical reflector.

The multiple interferograms are processed by the software jointly, so that even portions of each interferogram where fringes are undersampled increase resolution and accuracy and speed up the measurement. This becomes possible because the uncertainty of undersampled fringe data is reduced by fringe patterns of the same portion of the wavefront, with varying frequency and shift at different displacements of the reference mirror. This invention has significant advantage compared to stitching in conventional SSI. Unlike SSI, the multiple interferograms produced by the device and method according to this invention are different measurements of the same wavefront since illumination and location of the dome are constant. The inherent redundancy of the measurement makes useful even undersampled portions of the interferograms, complemented by high-resolution sampling of the same portions of the wavefront at different displacements of the reference sphere. This redundancy enables statistical processing of the data to improve resolution of the wavefront measurement, as well as determining and accounting for any residual alignment errors in the setup.

Moving spherical reflectors in an interferometric setup is easy to implement. Standard methods of interferometry, such as measuring radius of curvature, routinely involve displacement of the reflecting component, by measuring the distance between two locations of interference to determine the radius of curvature.

The spherical reference is easy to produce and test, unlike aspheric nulls. Also unlike aspheric nulls, the shape of the spherical mirror is not specific to a particular dome shape. Rather, it is applicable to any existing and future designs of domes and corrector optics. Spherical reflectors are readily available from many sources as commercial components. In addition to its optical properties guaranteed by the manufacturer, each reflector can easily be self-tested on the same interferometric setup, with the dome (optical component under test) removed, to account for (subtract) any residual errors in its shape. This potentially relaxes the required tolerances on the mirror quality, further reducing the cost of the attachment of this invention.

The spherical reflector is much easier to align, compared to aspheric nulls. In the above example of the standard method for measuring radius of curvature, interference pattern is lost between the two reflections that produce fringes. In contrast, with the method of this invention fringes are always visible, making alignment easier. This invention is an attachment to a standard interferometer; its cost will be a small fraction of the cost of the interferometer itself. The measurement procedure is easily automated to reduce operating expense and ensure low cost of ownership.

Full aperture coverage has the advantage of presenting overall wavefront aberrations and surface optical figures of the dome on each interferogram, so that slow systematic deviations from prescribed wavefront and surface shape are easily detected, unlike with subaperture testing. While full aperture coverage is readily provided by the system of this invention, partial aperture coverage is readily provided by the design of this invention, by placing the dome closer to the interferometer's spherical attachment. This measurement mode may be used to detect local deviations from the dome optical prescription at higher magnifications, with the related lateral resolutions at microscopic levels, in the single-micron range.

The only optical element of the attachment according to this invention is the spherical reflector. In addition to simplicity of fabrication and testing, it is dispersion-free, so that the same attachment is applicable in a wide range of wavelengths with no change to the layout or alignment. This makes the attachment according to this invention equally applicable to operation at different wavelengths of commercial interferometry systems with expanded wavelength capabilities. The 3.39 µm wavelength of the He—Ne laser is the primary candidate for optics made of infrared materials, which may have high scattering in the visible, such as crystalline alumina, AlON, and Spinel. Several interferometers operating at this wavelength are commercially available. The 633 nm wavelength is more popular, with wider selection of commercial interferometers using it. This wavelength may be used for optics with lower scattering. In application to other materials, which have low scattering in the visible, this wavelength may be preferred, since it offers higher resolution and reduces cost of the overall system. Wall thickness of the optics to be tested also affects the amount of scattered light and hence the choice of the working wavelength.

Preliminary studies and proprietary experimental tests were conducted to explore the validity of the invention as disclosed herein. Zemax-EE Optical Design Program was used for modeling the interferometric setup of this invention.

Elliptical surface shape of the dome was modeled as a standard Zemax surface, with the conic constant in the 0 to −1 range. Sapphire was used as the optical material.

Figure 6:
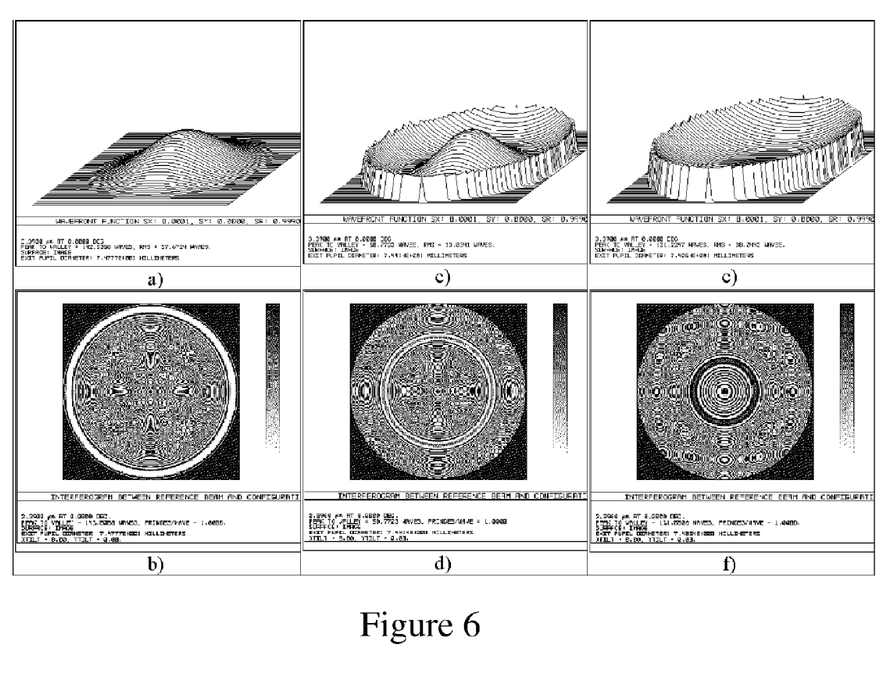
FIG. 6 illustrates wavefront maps and interferograms at different displacements of the reference sphere (Zemax modeling) for: a), b) −0 mm; c), d) −1 mm; e), f) −2 mm.

Wavefront analysis was performed on the modeled optical system; wavefront maps and simulated interferograms were produced. FIG. 6 shows typical results of the Zemax modeling. The overall amount of aberrations is relatively high: typically tens to low-hundreds of waves peak to peak on the full aperture, at the 3.39 μm wavelength. It should be noted that the example of FIG. 6 was one with relatively-low aberrations from several modeling runs produced in our studies, and was selected merely for illustration purposes. In reality, the dome under test may have larger aberrations. The single frame full-aperture metrology, such as reported by Lerner et al., is problematic at such aberrations due to high spatial frequency of the fringe pattern and limited resolution of the interferometer imaging sensor. The metrology of this invention, on the other hand, is free from this limitation, leveraged by processing multiple interferograms each with a different portion of the same wavefront reconstructed from well-resolved fringes over a subaperture, such as one shown in FIG. 6, f).

The same hardware of this invention is universally applicable to measurement of a wide range of aberrated wavefronts (wavefront metrology). Higher aberrations require a higher number of discrete axial displacements of the reference mirror and capturing a higher number of interferograms.

As the reference mirror is displaced relative to the stationary dome (optical component under test), different circular areas of the wavefront and the dome produce well-resolved fringes. The overall wavefront can be subdivided into rings concentric with the fringe pattern, each ring covering a portion of the aperture. Within these ring-shaped subapertures, the amount of aberration is much smaller, as is summarized in Table 1, below. Depending on the particular dome geometry, larger number of rings and related reference positions may be necessary to cover the full aperture at high resolution.

TABLE 1

Three ring subapertures cover full wavefront, each with less than 10 waves peak to peak aberration

| Ring # | Mirror Displacement | OPD Overall, P-P waves | Ring Min Aperture | Ring Max Aperture | OPD Ring, P-P waves |
|---|---|---|---|---|---|
| 1 | 2 mm | 121 | 0 | 0.33 | 6.1 |
| 2 | 1.8 mm | 90 | 0.33 | 0.67 | 5.5 |
| 3 | 0.87 mm | 60 | 0.67 | 1.0 | 8.3 |

During numeric experimental testing, the same Zemax model was used to determine sensitivity of the interferogram to deviations of the dome surface (optical component under test) from its perfect shape. The original interferogram (perfect dome shape) and one with the modified shape were produced and stored. The two interferograms were then subtracted from each other. Two such numeric experiments were performed. In one, the wall thickness was increased by several sub-micron values; in the other, similar sub-micron variations were introduced into the axial distance between the vertices of the inside and outside surfaces of the dome. In both cases, the differential interferogram proved quite sensitive to the errors introduced, promising for measurement of surface errors in the tens of nanometers range.

In addition, the Zemax model was used to compare sensitivity of the interferogram produced by this invention to tilt and lateral displacement of the reference reflector. The results were compared to similar tilt and displacement of an aspheric null reflector similar to one proposed by Lerner et al., which we modeled as a $4^{th}$ order general asphere optimized to introduce less than 0.1 wave aberration when perfectly aligned. Aberrations due to misalignment were substantially lower in the interferograms of this invention. More importantly, as is discussed in the following, while the interferograms of this invention may have hundreds of waves of aberration, the appropriate processing is still capable of high resolution measurement of transmitted wavefront aberrations. On the contrary, the method based on an aspheric null relies on low level of aberrations (zero aberrations for perfect dome shape) and is very susceptible to misalignment of the null.

Turning to improved wavefront stitching, there are significant differences in the stitching procedure of this invention from traditional stitching used in SSI. In SSI, each whole interferogram measures the wavefront from a subaperture of the optical surface (aperture) under test; the complete wavefront is stitched together by minimizing mismatch at overlapping boundaries. The stitching errors accumulate with the number of subapertures. More importantly, the same subaperture of the component under test produces different aberrations as the component is rotated in the setup. Even for spherical domes, this increases the stitching error. For aspheric domes, this introduced difference in aberrations makes SSI impossible to use.

In the interferometry of this invention, each interferogram captures the wavefront over the whole aperture of the dome under test. In each interferogram, a portion of the sensor pixels will capture well-resolved fringes over a subaperture, while other pixels will capture undersampled fringes of high spatial frequencies. The location of the well-resolved fringes in the interferogram will change with the controlled axial displacement of the reference spherical mirror. Collectively, the multiple interferograms will capture well-resolved fringes for all parts of the wavefront. The same portion of the wavefront will be well-resolved on some interferograms and undersampled on others. Since the wavefront itself is the same, all of these data, including under-sampled data, contributes to increased accuracy of wavefront reconstruction. Unlike standard SSI, capturing more interferograms therefore reduces the wavefront error produced.

In SSI, only a small portion of the wavefront at any dome orientation is informative. Unlike SSI, according to this invention, every new position of the reference mirror produces a new representation of the same wavefront, aberrated by the dome under the same illumination. Even undersampled fringes from the same portion of the wavefront carry useful additional information, such as the "spatial phase" (shift) of the fringes.

Figure 7:
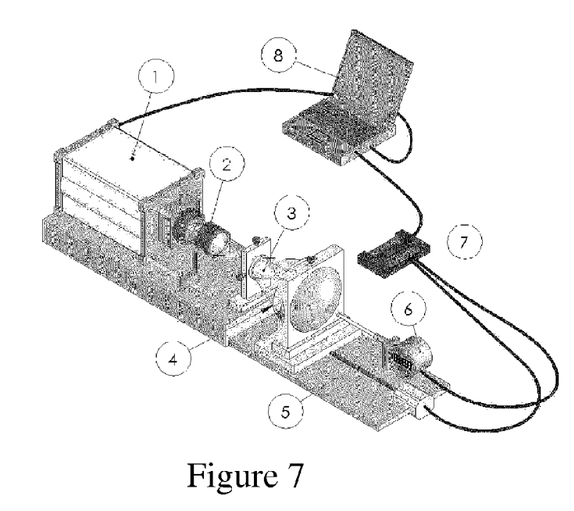
FIG. 7 illustrates the preferred embodiment in further detail including: standard interferometer 1; transmission sphere 2; optics under test 3; spherical reference mirror 4; linear stage, preferably, motorized for facilitating axial displacement 5; digital micrometer 6; data acquisition and control unit 7; PC computer 8.

FIG. 7 shows the preferred embodiment of this invention in further detail. A standard interferometer is equipped with a transmission sphere, preferably of the converging type.

The rest of the components—the fixture holding the optic under test and the spherical reflector on a tilt and translation stage—are the attachment according to the preferred embodiment.

Displacement of the spherical reference is monitored by a digital micrometer 6, which may be replaced by an electronic encoder for easy automation.

Motorized stage and digital micrometer can be combined into a single closed-loop controlled stage, such as equipped with an encoder.

Figure 5:
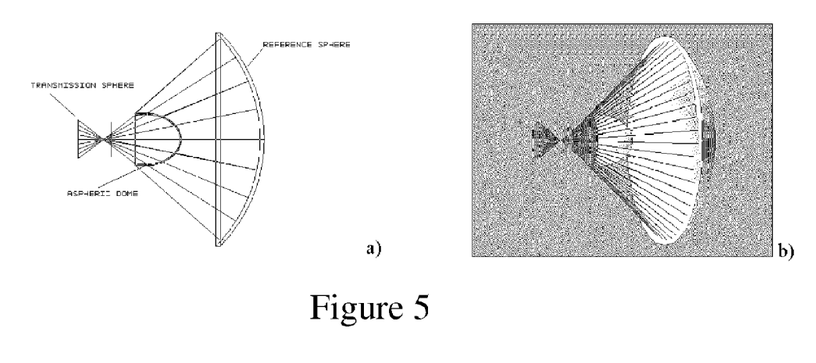
FIG. 5 illustrates a Zemax model of elliptical dome metrology in: a) a 2D plan view layout; b) 3D solid perspective view.

Insofar as the Calibration Procedure, all of the measurements produced by this invention are done relative to the reference spherical mirror. If the surface of this mirror deviates from the prescription, the errors will appear in the measured wavefront as additional aberrations. This is common between this invention and all other interferometer setups, including measuring transmission wavefronts of domes with an aspheric null in a single-frame interferometry setup. Unlike aspheric nulls, the spherical reference mirror of this invention is much easier to fabricate and test, which translates directly into a simple and reliable calibration method, or procedure. Fabrication of the spherical mirror is a well-established, standard process. System calibration with the spherical reference is easy in this invention, as discussed above. The only modification of the setup of FIG. 5 necessary is removing the optical component under test. The reference spherical reflector is then aligned to be concentric with the focal point of the transmission sphere. Alignment is performed while monitoring the fringe pattern, which in the position of best alignment is processed to store the mirror aberrations, to be later subtracted from all the measured wavefront aberrations. With this approach, moderate imperfections of the reference reflector are acceptable.

Regarding the Measurement Method, the same system and method according to this invention are equally applicable to a wide range of other "highly aberrated by design" optics. No change in the setup is required specific to a particular type of optics to be tested. The only parameter which may differ between different optics under test is the number of individual interferograms needed to be captured and the corresponding discrete axial locations of the reference spherical reflector.

Figure 8:
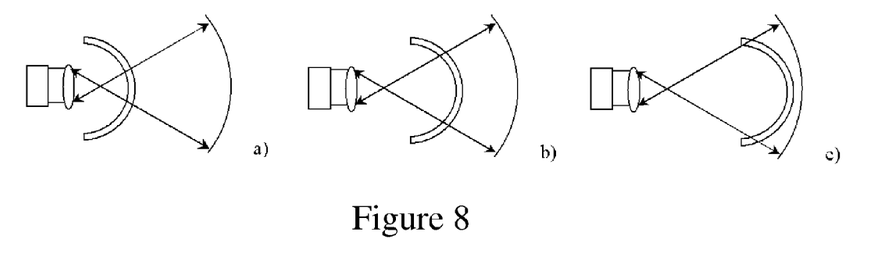
FIG. 8 is a plan view illustrating the testing transmission wavefront of a semispherical with progressively increasing coverage.

The test layout is shown in FIG. 7, with the semi-spherical dome 3 as the optical component under test. Depending on location of the optical component under test in the diverging beam, the surface coverage and the amount of aberrations varies, with higher aberrations at higher coverage (FIG. 8, a-c). At each coverage, a series of fringe patterns is captured and processed using an appropriate algorithm to produce a wavefront aberration map. As the coverage increases, aberrations will grow.

Aberrations of the aberrated optical component also vary with its orientation. An appropriate computer algorithm can calculate transmitted wavefront aberrations for an arbitrary orientation of the component under test. This can be achieved by fringe processing to separate the contributions of the inside and the outside surfaces of the optic under test, to arrive at the 3D profile of each surfaces and their relation to each other, thus yielding a complete surface metrology of the optical component under test.

Figure 9:
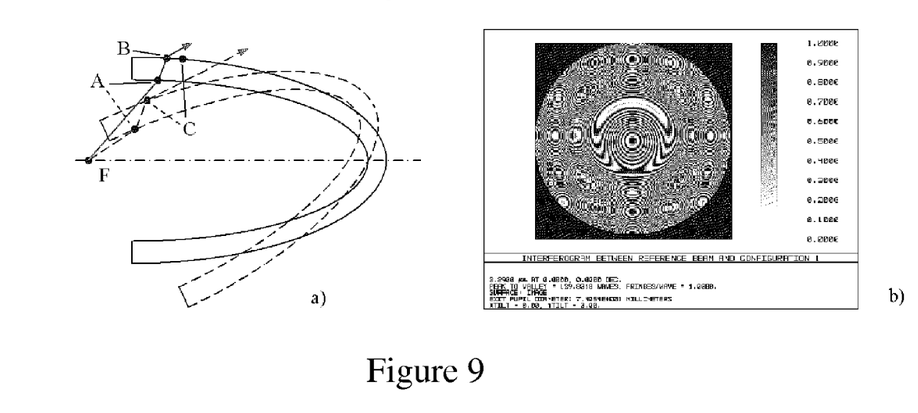
FIG. 9 illustrates a) in plan view, tilting the dome creating an offset (shift) between the two surfaces in their contribution to the transmitted wavefront aberration (see discussion in text); and b) a typical interferogram with a tilted dome.

This far, the discussion has focused on wavefront metrology. To achieve the above calculation of surface shapes (surface metrology), two measurements of the transmitted wavefront need to be made, with different tilt of the component under test relative to the optical axis (FIG. 9, a). The two measurements allow for separating the contributions by each surface in the transmitted wavefront aberration, to arrive at the optical figure (surface metrology profile) of each surface separately.

Referring to FIG. 9, consider two rays passing through the focal point F and the same point A on the inside surface of the dome, both with and without the tilt. The ray at no tilt is shown as a solid arrow; with the tilt, the ray is shown as a dashed arrow. While points F and A remain the same regardless of the tilt, the corresponding points where the two rays intersect the outside surface are different: point B without the tilt and point C with the tilt. Point C is marked on both tilted and un-tilted dome to emphasize its offset from point B.

The difference between the two wavefront maps (wavefront metrologies), measured with and without the tilt, is the first calculation to make. The difference is directly related to the surface gradient of the dome surfaces. First, the wavefront gradient is to be calculated. The surface profile (optical figure) of each of the two surfaces will then be produced by integration of the gradient.

An optimal value of tilt exists for measuring optical figure of the two dome surfaces. If the tilt is too small, the two wavefronts measured are very close to each other, and their difference is comparable to the measurement error (affected by the signal to noise ratio, SNR). In this case, the error of the calculated surface profiles is large as well. In the opposite extreme, when the tilt is too large, the accuracy of integration may be affected. It is thus desirable to consider the choice of the boundary conditions for the integration and verification of the results by applying redundant boundary conditions.

While this invention is illustrated in terms of one set of interferograms taken with no tilt and a second set taken with a predetermined tilt, it is understood that more generally, the complete surface metrology can be obtained by taking interferograms at two different tilt angles, namely, a first predetermined tilt angle and a different, second predetermined tilt angle. A set of interferograms taken with no tilt corresponds, therefore, to the special case where the first predetermined tilt angle is substantially equal to zero, i.e., where the normal to the optical component under test points axially along the direction of wavefront propagation.

It is to be understood that computer software media which drives the device and method disclosed herein according to the specifications disclosed herein is also considered be within the scope of this disclosure and its associated claims. This is irrespective the means by which said media is distributed or represented, e.g., computer-readable disk, software downloadable via the internet or other telecommunications vehicles, etc.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. An interferometry system for testing optical components including those with high aberrations, comprising:
 a source of a spherical test wavefront, whereby an axial line is defined by a direction of propagation of said wavefront;
 a spherical reference mirror;
 a computerized control system and mechanical apparatus responsive thereto for controlling an axial displacement between an optical component under test and said spherical reference mirror, with said optical component under test situated between said source and said spherical reference mirror; and
 a computerized device including a processor for deriving a substantially complete first-tilt-alignment wavefront metrology of said optical component under test from a plurality of first-tilt-alignment interferograms, wherein, responsive to said computerized control system:
 said plurality of first-tilt-alignment interferograms is obtained with said optical component under test oriented at a first predetermined tilt angle relative to said propagation of said wavefront; and
 each of said first-tilt-alignment interferograms is obtained, with said first predetermined tilt angle held fixed, by said mechanical apparatus discretely varying said axial displacement between said optical component under test and said spherical reference mirror.

2. The system of claim 1, wherein said first predetermined tilt angle is approximately equal to zero relative to said axial line.

3. The system of claim 1, further comprising:
said computerized control system and mechanical apparatus responsive thereto for further controlling the angle of tilt of said optical component under test relative to the axial propagation of said wavefront, said optical component under test comprising two surfaces thereof; and
said computerized device for deriving a substantially complete second-tilt-alignment wavefront metrology of said optical component under test from a plurality of second-tilt-alignment interferograms, and further, for deriving a substantially complete surface metrology of said optical component under test using said first-tilt-alignment wavefront metrology in combination with said second-tilt-alignment wavefront metrology; wherein, responsive to said computerized control system:
said plurality of second-tilt-alignment interferograms is obtained with said optical component under test tilted at a second predetermined tilt angle relative to said propagation of said wavefront; and
each of said second-tilt-alignment interferograms is obtained, with said second predetermined tilt angle held fixed, by said mechanical apparatus discretely varying said axial displacement between said optical component under test and said spherical reference mirror.

4. The system of claim 3, wherein said first predetermined tilt angle is approximately equal to zero relative to said axial line.

5. The system of claim 3, said computerized device for deriving said substantially complete surface metrology further comprising processing capability for:
calculating a difference between said first-tilt-alignment wavefront metrology and said second-tilt-alignment wavefront metrology;
deducing therefrom a surface gradient of said optical component under test; and
integrating said surface gradient.

6. The system of claim 1, further comprising:
said computerized device for deriving said first-tilt-alignment wavefront metrology complementing under-sampled portions of one first-tilt-alignment interferogram with high-resolution corresponding portions of another first-tilt-alignment interferogram for a given corresponding portion of said optical component under test.

7. The system of claim 3, further comprising:
said computerized device for deriving said first-tilt-alignment wavefront metrology complementing under-sampled portions of one first-tilt-alignment interferogram with high-resolution corresponding portions of another first-tilt-alignment interferogram for a given corresponding portion of said optical component under test; and
said computerized device for deriving said second-tilt-alignment wavefront metrology complementing under-sampled portions of one second-tilt-alignment interferogram with high-resolution corresponding portions of another second-tilt-alignment interferogram for a given corresponding portion of said optical component under test.

8. The system of claim 1, further comprising:
said computerized device for deriving said first-tilt-alignment wavefront metrology by subtracting any deviations of said spherical reference mirror from a perfect sphere, as determined by self-testing said spherical reference mirror without situating optical component under test between said source and said spherical reference mirror.

9. The system of claim 1, further comprising:
said computerized device for deriving said first- and second-tilt-alignment wavefront metrologies by subtracting any deviations of said spherical reference mirror from a perfect sphere, as determined by self-testing said spherical reference mirror without situating optical component under test between said source and said spherical reference mirror.

10. An interferometry method for testing optical components including those with high aberrations, comprising:
situating an optical component under test between a source of a spherical test wavefront and a spherical reference mirror;
propagating a spherical test wavefront, whereby an axial line is defined by a direction of propagation of said wavefront;
deriving a substantially complete first-tilt-alignment wavefront metrology of said optical component under test from a plurality of first-tilt-alignment interferograms obtained with said optical component under test held fixed at a first predetermined tilt angle relative to a direction of propagation of said wavefront; and
varying an axial displacement between said optical component under test and said spherical reference mirror to obtain each said first-tilt-alignment interferogram.

11. The method of claim 10, further comprising setting said first predetermined tilt angle to be approximately equal to zero relative to said axial line.

12. The method of claim 10, further comprising:
deriving a substantially complete second-tilt-alignment wavefront metrology of said optical component under test from a plurality of second-tilt-alignment interferograms obtained with said optical component under test held fixed at a second predetermined tilt angle relative to a direction of propagation of said wavefront;
varying said axial displacement between said optical component under test and said spherical reference mirror to obtain each said second-tilt-alignment interferogram; and
deriving a substantially complete surface metrology of said optical component under test using said first-tilt-alignment wavefront metrology in combination with said second-tilt-alignment wavefront metrology.

13. The method of claim 12, further comprising setting said first predetermined tilt angle to be approximately equal to zero relative to said axial line.

14. The method of claim 12, said deriving said substantially complete surface metrology further comprising:
calculating a difference between said first-tilt-alignment wavefront metrology and said second-tilt-alignment wavefront metrology;
deducing therefrom a surface gradient of said optical component under test; and
integrating said surface gradient.

15. The method of claim 10, further comprising deriving said first-tilt-alignment wavefront metrology by:
complementing under-sampled portions of one first-tilt-alignment interferogram with high-resolution corresponding portions of another first-tilt-alignment interferogram for a given corresponding portion of said optical component under test.

16. The method of claim 12, further comprising:
deriving said first-tilt-alignment wavefront metrology by complementing under-sampled portions of one first-tilt-alignment interferogram with high-resolution corresponding portions of another first-tilt-alignment interferogram for a given corresponding portion of said optical component under test; and deriving said second-tilt-alignment wavefront metrology by complementing under-sampled portions of one second-tilt-alignment interferogram with high-resolution corresponding portions of another second-tilt-alignment interferogram for a given corresponding portion of said optical component under test.

17. The method of claim 10, further comprising deriving said first-tilt-alignment wavefront metrology by:

determining any deviations from a perfect sphere in a shape of said spherical reference mirror by self-testing said spherical reference mirror without situating optical component under test between said source and said spherical reference mirror; and subtracting any said deviations.

18. The method of claim 10, further comprising deriving said first- and second-tilt-alignment wavefront metrologies by:

determining any deviations from a perfect sphere in a shape of said spherical reference mirror by self-testing said spherical reference mirror without situating optical component under test between said source and said spherical reference mirror; and subtracting any said deviations.

19. Computerized media for operating a computerized device, for use in connection with a interferometry method for testing optical components including those with high aberrations, comprising computer instructions for:

deriving a substantially complete first-tilt-alignment wavefront metrology of an optical component under test from a plurality of first-tilt-alignment interferograms obtained with said optical component under test held fixed at a first predetermined tilt angle relative to a direction of propagation of a spherical test wavefront; and via a mechanical apparatus responsive to said computer instructions, varying an axial displacement between said optical component under test and a spherical reference mirror to obtain each said first-tilt-alignment interferogram, wherein:

said optical component under test is situated between a source of said spherical test wavefront and said spherical reference mirror; and said spherical test wavefront is propagated, whereby an axial line of said axial displacement is defined by a direction of propagation of said wavefront.

20. The computerized media of claim 19, further comprising computer instructions, via said mechanical apparatus, for setting said first predetermined tilt angle to be approximately equal to zero relative to said axial line.

21. The computerized media of claim 19, further comprising computer instructions for:

deriving a substantially complete second-tilt-alignment wavefront metrology of said optical component under test from a plurality of second-tilt-alignment interferograms obtained with said optical component under test held fixed at a second predetermined tilt angle relative to a direction of propagation of said wavefront;

via said mechanical apparatus, varying said axial displacement between said optical component under test and said spherical reference mirror to obtain each said second-tilt-alignment interferogram; and deriving a substantially complete surface metrology of said optical component under test using said first-tilt-alignment wavefront metrology in combination with said second-tilt-alignment wavefront metrology.

22. The computerized media of claim 21, further comprising computer instructions, via said mechanical apparatus, for setting said first predetermined tilt angle to be approximately equal to zero relative to said axial line.

23. The computerized media of claim 21, said computer instructions for said deriving said substantially complete surface metrology further comprising computer instructions for:

calculating a difference between said first-tilt-alignment wavefront metrology and said second-tilt-alignment wavefront metrology;

deducing therefrom a surface gradient of said optical component under test; and integrating said surface gradient.

24. The computerized media of claim 19, said computer instructions for deriving said first-tilt-alignment wavefront metrology further comprising computer instructions for:

complementing under-sampled portions of one first-tilt-alignment interferogram with high-resolution corresponding portions of another first-tilt-alignment interferogram for a given corresponding portion of said optical component under test.

25. The computerized media of claim 21:

said computer instructions for deriving said first-tilt-alignment wavefront metrology further comprising computer instructions for complementing under-sampled portions of one first-tilt-alignment interferogram with high-resolution corresponding portions of another first-tilt-alignment interferogram for a given corresponding portion of said optical component under test; and said computer instructions for deriving said second-tilt-alignment wavefront metrology further comprising computer instructions for complementing under-sampled portions of one second-tilt-alignment interferogram with high-resolution corresponding portions of another second-tilt-alignment interferogram for a given corresponding portion of said optical component under test.

26. The computerized media of claim 19, said computer instructions for deriving said first-tilt-alignment wavefront metrology further comprising computer instructions for:

determining any deviations from a perfect sphere in a shape of said spherical reference mirror by self-testing said spherical reference mirror without situating optical component under test between said source and said spherical reference mirror; and subtracting any said deviations.

27. The computerized media of claim 19, said computer instructions for deriving said first- and second-tilt-alignment wavefront metrologies further comprising computer instructions for:

determining any deviations from a perfect sphere in a shape of said spherical reference mirror by self-testing said spherical reference mirror without situating optical component under test between said source and said spherical reference mirror; and subtracting any said deviations.

* * * * *